US005507976A

United States Patent [19]

Bringley et al.

[11] Patent Number: 5,507,976
[45] Date of Patent: *Apr. 16, 1996

[54] STABILIZED PHOSPHOR INTERMEDIATES, STORAGE PHOSPHORS, RADIATION IMAGE STORAGE PANELS, AND PREPARATION METHODS

[75] Inventors: Joseph F. Bringley, Rochester; Philip S. Bryan, Webster; Andrea M. Hyde, Hamlin, all of N.Y.

[73] Assignee: Eastman Kodak Company, Rochester, N.Y.

[*] Notice: The term of this patent shall not extend beyond the expiration date of Pat. No. 5,464,568.

[21] Appl. No.: 300,113

[22] Filed: Sep. 2, 1994

Related U.S. Application Data

[63] Continuation-in-part of Ser. No. 157,582, Nov. 24, 1993, abandoned.

[51] Int. Cl.$^6$ .................................................. C09K 11/61
[52] U.S. Cl. ........................... 252/301.4 H; 250/484.2; 428/691
[58] Field of Search ................. 252/301.4 H; 250/484.2, 250/483.1; 428/691

[56] References Cited

U.S. PATENT DOCUMENTS

| | | | |
|---|---|---|---|
| 2,502,529 | 4/1950 | Murray | 250/483 |
| 2,887,379 | 5/1959 | Blake et al. | 430/139 |
| 3,023,313 | 2/1962 | De La Mater et al. | 252/301.4 H |
| 3,300,310 | 1/1967 | Kennard et al. | 430/139 |
| 3,300,311 | 1/1967 | Kennard et al. | 250/483 |
| 3,617,285 | 11/1971 | Staudenmayer | 252/301.2 R |
| 3,743,833 | 7/1973 | Martic et al. | 250/487.1 |
| 3,836,784 | 9/1974 | Bates et al. | 250/483.1 |
| 4,076,897 | 2/1978 | Joiner | 252/301.4 H |
| 4,138,529 | 2/1979 | Mori et al. | 428/539 |
| 4,239,968 | 12/1980 | Kotera et al. | 250/237.1 |
| 4,360,571 | 11/1982 | Rabatin | 428/691 |
| 4,374,905 | 2/1983 | Rabatin | 428/691 |
| 4,491,736 | 1/1985 | Teraoka | 252/484.1 |
| 4,505,989 | 3/1985 | Umemoto et al. | 428/691 |
| 4,912,333 | 3/1990 | Roberts et al. | 250/489.1 |
| 4,926,047 | 5/1990 | Takahashi et al. | 252/301.4 H |
| 5,077,144 | 12/1991 | Takahashi et al. | 252/301.4 H |

FOREIGN PATENT DOCUMENTS

| | | |
|---|---|---|
| 0234385 | 9/1987 | European Pat. Off. . |
| 2017140 | 10/1979 | United Kingdom . |

OTHER PUBLICATIONS

*Research Disclosure*, vol. 154, Feb. 1977, Item 15444.

*Research Disclosure*, vol. 176, Dec. 1978, Item 17643, Section XVII.

*Research Disclosure*, vol. 184, Aug. 1979, Item 18431, Section I.

*Primary Examiner*—Melissa Bonner
*Attorney, Agent, or Firm*—Robert Luke Walker

[57] ABSTRACT

A radiographic image storage phosphor, stabilized intermediate, and methods for preparing storage phosphor, and stabilized intermediate. The storage phosphor is the product of firing a combination of species characterized by the relationship:

$$MFX_{1-z}I_z \cdot uM^aX^a:yA:eQ:tD$$

wherein M is selected from Mg, Ca, Sr, and Ba; X is selected from Cl and Br; $M^a$ is selected from Na, K, Rb, and Cs; $X^a$ is selected from F, Cl, Br, and I; A is selected from Eu, Ce, Sm, and Tb; Q is selected from BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$; D is selected from V, Cr, Mn, Fe, Co, and Ni; z is from $1 \times 10^{-4}$ to 1; u is from 0 to 1; y is from $1 \times 10^{-4}$ to 0.1; e is from 0 to 1; and t is from 0 to $10^{-2}$; and oxosulfur reducing agent for iodine, which is present in an amount sufficient to increase relative photostimulated luminescence intensities relative to the phosphor defined above absent the reducing agent for iodine.

30 Claims, No Drawings

STABILIZED PHOSPHOR INTERMEDIATES, STORAGE PHOSPHORS, RADIATION IMAGE STORAGE PANELS, AND PREPARATION METHODS

This is a Continuation-In-Part of patent application Ser. No. 08/157,582, filed Nov. 24, 1993, now abandoned.

FIELD OF THE INVENTION

The invention relates to radiographic phosphors, methods for producing radiographic phosphors, and radiographic phosphor panels. The invention more particularly relates to stabilized phosphor intermediates, methods for stabilizing phosphor intermediates, methods for preparing phosphors, storage phosphor panels, and a stabilized-iodide storage phosphor that is the firing product of species satisfying the general formula:

$$MFX_{1-z}I_z \cdot uM'X' : YA : eQ : tD,$$

and oxosulfur reducing agent for iodine.

BACKGROUND OF THE INVENTION

A radiographic phosphor panel contain a layer of phosphor, a crystalline material which responds to X-radiation on an image-wise basis. Like many other crystalline materials, radiographic phosphors have a crystal matrix which allows for the replacement of some atoms by other similar atoms, but does not readily accept other atoms or moieties. Radiographic phosphor panels can be classified, based upon their phosphors, as prompt emission panels and image storage panels.

Intensifying screens are the most common prompt emission panels. Intensifying panels are used to generate visible light upon exposure of the intensifying panel to X-radiation. A sheet of photographic film is positioned to intercept the visible light generated and commonly is pressed against the intensifying panel within a light-tight cassette. Other prompt emission panels operate similarly, but in place of the photographic film have some other means for visualizing the X-radiation.

Storage panels have storage phosphors, that have the capability of storing latent X-ray images for later release, apparently by locally trapping electron-hole pairs created by incident X-rays. Storage phosphors are distinguishable from the phosphors used in X-ray intensifying or conversion screens. In the latter, a latent image is not stored and X-radiation causes the immediate release of visible light from irradiated phosphor crystals.

Radiation image storage panels are used in computed radiography. The panel is first exposed to X-radiation to create a latent image. The panel is then stimulated with longer wavelength radiation, resulting in the emission of radiation at a third wavelength. Typically a laser having a red or infrared beam is scanned over the panel, resulting in the emission of green or blue radiation. The emitted light is collected and the resulting signal is processed electronically to produce a final image.

Degradation of final images due to panel discoloration has long been recognized for intensifying screens. There has not, however, been agreement as to the source of that discoloration. What has been noticed is that screens subject to prolonged exposure to photographic film have tended to become discolored. U.S. Pat. Nos. 4,374,905 and 4,360,571 state that the discoloration is due to "volatile organic constituents escaping from the associated photographic film" (U.S. Pat. No. 4,374,905, column 1, lines 40–59 and U.S. Pat. No. 4,360,571, column 1, lines 46–64). Great Britain Patent Application No. GB 2 017 140 A states:

"[I]t has been discovered that screens containing lanthanum-oxy-halide phosphors tend to discolor rapidly when in use and in particular when held in contact with an X-ray film, . . .

"Gadolinium-oxy-halides are similar . . .

"In spite of intensive research into this discolouration defect the cause of it is not yet clearly known but it appears to be a complex reaction caused, in part at least, by the hydroscopic nature of the lanthanum-oxy-halide phosphors or gadolinium-oxy-halide phosphors, the nature of the binder and the presence of the X-ray film held in contact with the screen for a period of time.

"Furthermore, under somewhat different conditions of use X-ray screens and in particular X-ray screens which contain lanthanum-oxyhalide or gadolinium-oxyhalide phosphors can lose speed due to a different defect which appears to involve only the phosphor. This is hydrolysis of the phosphor which is caused by water present in the phosphor layer due either to atmospheric moisture or aqueous cleaning fluid penetrating the protective layer of the screen. It is thought that quantities of halide or more surprisingly, the free halogen, released by hydrolysis may actually catalyse the discolouration of the binder or of compounds having migrated from the film." (page 1, lines 14–33)

U.S. Pat. No. 4,374,905, to Rabatin, teaches a solution to both discoloration by "volatile organic constituents" and attack by water. The phosphor for an intensifying screen was milled with anhydrous $MgSO_4$ or $ZnSO_4$ during preparation of the screen. It was proposed that the protective action was based upon the reaction:

$$MgSO_4 + 2HOH \rightarrow Mg(OH)_2 + 2H^+ + SO_4^{2-}.$$

U.S. Pat. No. 3,836,784, to Bates et al, teaches that small amounts of "stabilizers", such as sodium thiosulfate or potassium thiosulfate can be included in the fluorocarbon binder of an intensifying screen. Bates et al, which used an iodide containing phosphor, noted:

"[A]ctivated iodide phosphors are extremely hydroscopic. Absorption of small amounts of water rapidly reduces the conversion efficiency to a vanishingly small value. In order to employ activated iodide phosphors it is therefore necessary to provide the activated iodide phosphor in the screen in a form in which it remains stable for long periods of time.

"Various ways have been taught for using thallium activated potassium iodide and protecting the iodide from moisture." (Bates et al, column 1, lines 20–30)

U.S. Pat. No. 3,023,313 to De La Mayer et al teaches the addition of small amounts of sodium thiosulfate or potassium thiosulfate to the polymer binder of an intensifying screen. Examples list 2 grams and 6 grams of sodium thiosulfate per 200 grams of potassium iodide phosphor.

In U.S. Pat. No. 4,360,571, to Rabatin, phosphors were treated with fatty acids or metal salts of fatty acids to prevent discoloration by "volatile organic constituents" and attack by water. In GB 2 017 140 A, intensifying screens were stabilized against discolouration and hydrolysis by incorporation of a compound containing a free epoxy group and, optionally, a dialkyl tin compound such as dibutyl tin diocytl as an additional stabilizer.

Radiation image storage panels, unlike intensifying screens, are subject to degradative losses of both emitted light and stimulating radiation. Since these effects are cumulative, discoloration can be an even more serious issue in storage panels than in intensifying screens.

Yellowing of a phosphor layer of a radiation image storage phosphor panel, in which the phosphor contains iodine, is described in European Patent Specification No. EP 0 234 385 B1. The yellowing is ascribed to liberation of free iodine. The phosphor is divalent europium activated alkaline earth metal fluorohalide phosphor containing iodine or bismuth activated alkali metal halide phosphor containing iodine. The solution described for the yellowing problem, is incorporation in the phosphor layer of a compound containing a free epoxy group and/or a compound selected from: phosphites, organotin compounds, and specific metal salts of organic acids.

Alkaline earth metal fluoro-iodide storage phosphors are described in a number of patent publications. For example, U.S. Pat. No. 4,239,968 teaches a radiation image storage panel including storage phosphors designated by the general formula: $(Ba_{1-x}M''x)FX:yA$; in which $M''$ is Mg, Ca, Sr, Zn, or Cd; X is Cl, Br, I, or a combination thereof; A is selected from Eu, Tb, Ce, Tm, Dy, Pr, Ho, Nd, Yb, and Er; x is from 0 to 0.6; and y is from 0 to 0.2. U.S. Pat. No. 4,926,047 to Takahashi et al, teaches that metal oxides may be included in the starting materials for MFX type storage phosphors. Although it is not completely understood how the oxide improves the performance of the phosphor, advantages such as increased luminescence, improved afterglow, and sinter prevention have been mentioned. It is also not known how metal oxide is incorporated into phosphor. There are a number of possibilities, for example, incorporation within the host lattice, and adherence to the surface of crystals.

European Patent Application No. 0 107 192 A1 teaches a radiation image storage panel including storage phosphors designated by the general formula:

$$M''FX.aM'X'.bM'''X''_2.cM''''X'''_3.xA:yEu^{2+};$$

in which $M''$ is Ba, Sr, and/or Ca; $M'$ is Li, Na, K, Rb, and/or Cs; $M'''$ is Be and/or Mg; $M''''$ is Al, Ga, In and/or Tl; A is metal oxide; X is Cl, Br, and/or I; X', X'', and X''' are F, Cl, Br, and/or I; a is from 0 to 2; b is from 0 to $10^{-2}$; c is from 0 to $10^{-2}$; a+b+c is greater than or equal to $10^{-6}$; x is from 0 to 0.5; and y is from 0 to 0.2.

U.S. Pat. No. 4,505,989 to Umemoto et al teaches a radiation image storage panel including storage phosphors designated by the general formula:

$$M''FX.xNaX':yEu^{2+}:zA;$$

in which M'' is at least one alkaline earth metal selected from the group consisting of Ba, Sr, and Cs; each of X and X' is at least one halogen selected from the group consisting of Cl, Br, and I; A is at least one transition metal selected from the group consisting of V, Cr, Mn, Fe, Co and Ni; and x, y, and z are numbers satisfying the conditions of $0<x\leq 2$, $0<y\leq 0.2$ and $0< z\leq 10^{-2}$.

U.S. Pat. No. 4,138,529 to Mori et al teaches a complex halide phosphor represented by the composition formula $$MeF_2.aM'X_2.bKX'.cMe''SO_4:dEu^{2+};$$

wherein Me, Me' and Me'' each represent at least one of the alkaline earth metals of the group consisting of barium, strontium and calcium, X and X' each represent at least one of chlorine and bromine; and a, b, c and d are defined as follows: $0.3\leq A\leq 1.50$; $0.10< =B\leq 2.00$; $0.01\leq C\leq 1.00$; $0.001\leq D\leq 0.20$.

It would be desirable to provide improved preparation methods, phosphor intermediates, storage phosphor panels, and storage phosphor in which yellowing related degradation is reduced.

SUMMARY OF THE INVENTION

The invention, in its broader aspects, provides a storage phosphor being the product of firing a combination of species characterized by the relationship:

$$MFX_{1-z}I_z.uM^aX^a:yA:eQ:tD$$

wherein M is selected from Mg, Ca, Sr, and Ba; X is selected from Cl and Br; $M^a$ is selected from Na, K, Rb, and Cs; $X^a$ is selected from F, Cl, Br, and I; A is selected from Eu, Ce, Sm, and Tb; Q is selected from BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$; D is selected from V, Cr, Mn, Fe, Co, and Ni; z is from $1\times 10^{-4}$ to 1; u is from 0 to 1; y is from $1\times 10^{-4}$ to 0.1; e is from 0 to 1; and t is from 0 to $10^{-2}$; and oxosulfur reducing agent for iodine, which is present in an amount sufficient to increase relative photostimulated luminescence intensities relative to the phosphor defined above absent the reducing agent for iodine. The invention also provides a stabilized intermediate and methods for preparing storage phosphor and stabilized intermediate.

It is an advantageous effect of at least some of the embodiments of the invention that storage phosphors, stabilized phosphor intermediates, preparation methods, and storage phosphor panels are provided in which relative photostimulated luminescence intensities are increased relative to a control lacking the stabilizing effect resulting from presence of oxosulfur reducing agent in the phosphor intermediate.

DESCRIPTION OF PARTICULAR EMBODIMENTS

The stabilized-iodide storage phosphor of the invention is the product of firing what is referred to herein as a "stabilized intermediate": starting materials consisting essentially of a combination of species characterized by the relationship:

$$MFX_{1-z}I_z.uM^aX^a:yA:eQ:tD \qquad (1),$$

also referred to herein as a "primary precursor mixture"; and oxosulfur reducing agent for molecular iodine (also referred to herein as "oxosulfur reducing agent"). The oxosulfur reducing agent and the stabilization provided are discussed below in detail.

In formula (1), M is selected from Mg, Ca, Sr, and Ba. X is selected from Cl and Br. $M^a$ is selected from Na, K, Rb, and Cs. $X^a$ is selected from Cl, Br, and I. A is selected from Eu, Ce, Sm, and Tb. Q is an oxide selected from BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$. Specific oxides that are currently preferred are: $Al_2O_3$ and $SiO_2$. D is selected from V, Cr, Mn, Fe, Co, and Ni. Numbers are represented by the following: z is from $1\times 10^{-4}$ to 1; u is from 0 to 1; y is from $1\times 10^{-4}$ to 0.1; e is from 0 to 1, or more preferably from $10^{-5}$ to 0.1; and t is from 0 to $10^{-2}$. In a particular embodiment of the invention, M is selected from the group: Ca, Sr, or Ba. The same designations appearing elsewhere herein have the same meanings unless specifically stated to the contrary. Groups of materials, for example the materials defined by M, are to be understood as inclusive of combinations of materials in that group. It should also be understood, that even when oxide is not specifically added, oxygen is a normal trace ingredient in phosphors described herein and phosphors known in the art generally, since it is not ordinary practice in the art to take the extraordinary measures necessary to exclude traces of oxygen from a phosphor preparation.

In a preferred embodiment of the invention, the inventive storage phosphor is the product of firing a stabilized intermediate, consisting essentially of oxosulfur reducing agent and a combination of species characterized by the relationship:

$$(Ba_{1-a-b-c}Mg_aCa_bSr_c)FX_{1-z}I_z \cdot rM^aX^a{:}yA{:}eQ \qquad (2),$$

where X, $M^a$, $X^a$, A, Q, z, y and e have the same meanings as in formula (1) and the sum of a, b, and c is from 0 to 0.4, and r is from $10^{-6}$ to 0.1. In this embodiment, t in formula (1) equals 0 and the term $MFX_{1-z}I_z$ in formula (1) is subdivided to designate a barium fluoro halo component and an optional second alkali metal halo component. In a particular embodiment of the invention, $M^a$ in formula (2) is potassium and the storage phosphor is further characterized as disclosed in a U.S. patent application filed concurrently with this application, by Joseph F. Bringley, Philip S. Bryan and Andrea M. Hyde, entitled: ALKALINE EARTH METAL FLUOROBROMOIODIDE STORAGE PHOSPHOR AND RADIATION IMAGE STORAGE PANEL, the disclosure of which is hereby incorporated herein by reference.

The terms "oxosulfur reducing agent for molecular iodine" and "oxosulfur reducing agent" are used to designate oxygen and sulfur containing species capable of reducing free (molecular) iodine according to the half-reaction:

$$I_2 + 2e^- \rightarrow 2I^-$$

An oxosulfur reducing agent includes a moiety or ion of the general formula $$S_jO_k,$$

where j and k are positive integers such that the ratio, j/k is defined by $$0.25 < j/k < 1.0.$$

This formula is inclusive of species in which $S_jO_k$ is a free ion and species in which $S_jO_k$ is a charge bearing moiety covalently linked to another group. The terms "oxosulfur reducing agent" and the like are similarly inclusive of both uncharged species and charged anions. Where a distinction is necessary, for example, between a salt and its disassociated ion, it will be understood from context.

Many oxosulfur reducing agents have the general formula:

$$D_nS_jO_k$$

in which $D_n$ represents n cations chosen such that charge neutrality is obeyed. $S_jO_k$ ions of these oxosulfur reducing agents include: $SO_3^{2-}$, $S_2O_4^{2-}$, $S_2O_3^{2-}$, $S_2O_5^{2-}$, and $S_4O_6^{2-}$. $S_jO_k$ ions do not include $SO_4^{2-}$, $SO_5^{2-}$, and $S_2O_8^{2-}$, since these ions do not meet the above-indicated j/k ratio and are not reducing agents for molecular iodine. Suitable cations, also referred to herein as "counterions", are discussed in detail below.

A particular example of oxosulfur reducing agent is thiosulfate, $S_2O_3^{2-}$, such as barium thiosulfate, $BaS_2O_3$. Thiosulfate salts can be represented by the formula:

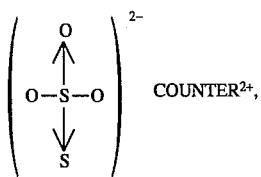

where COUNTER represents the counterion. The central sulfur atom has an oxidation number of 6+ and the outer sulfur atom has an oxidation number of 2−. Thiosulfate reacts with free (molecular) iodine in accordance with the following equation:

$$2S_2O_3^{2-} + I_2 \rightarrow S_4O_6^{2-} + 2I^-.$$

In another particular embodiment of the invention, the oxosulfur reducing agent is a polythionate. Polythionate ions are often represented by the general formula:

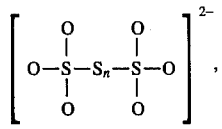

where n is from 1 to 22 or higher. The polythionate: $S_4O_6^{2-}$, which is commonly known as tetrathionate, is a product of the reaction of thiosulfate and free iodine.

Some other oxosulfur reducing agents are commonly referred to as "Bunte compounds" or "Bunte salts" and have the general structure:

$$R'SSO_3D,$$

where R' is a covalently bonded organic substituent and D is the counterion. Suitable R' groups include primary and secondary alkyl, having from 1 to 20 carbons. R' can be substituted or unsubstituted. Bunte compounds can be produced by the sulfonatothio-de-halogenation of alkyl halides with thiosulfate. Bunte compounds reduce free iodine in reaction schemes like the following:

$$R'SSO_3D + I_2 + H_2O \longrightarrow R'S\text{-}SR' + DHSO_4 + HI$$

The counterion, "D", in the oxosulfur reducing agent formulas above, can be a simple inorganic cation or a complex organic or inorganic cation. Counterions can be selected on the basis of convenience and non-interference with the desired characteristics of the phosphor produced. For example, if the phosphor includes a particular alkaline earth metal, the counterion can be selected to be the same element. Alternatively, the counterion can be selected so as to volatilize during firing. An example of the latter is the ammonium ion.

The oxosulfur reducing agent is present, in the stabilized intermediate, in an amount sufficient to increase relative photostimulated luminescence intensities relative to the same phosphor absent the reducing agent for iodine. The unfired precursor defines an upper limit for the presence of sulfur in the inventive phosphor. In a preferred embodiment of the invention, sulfur is present in the unfired composition, and thus in the crystals of the inventive phosphor, in a molar ratio of sulfur to alkaline earth metal of less than 0.20, or preferably, less than 0.020. In a preferred embodiment of the invention, the minimum amount of sulfur present in the unfired composition is in a molar ratio of sulfur to alkaline earth metal of greater than $1 \times 10^{-4}$ and less than 0.020. Oxosulfur reducing species is believed to be retained in the inventive phosphor after firing, its presence, oxidation number and other characteristics have not been confirmed.

With the exception of the oxosulfur reducing agent for iodine, the exact composition of the unfired precursor can be varied extensively, in terms of both volatile components and selection of individual salts, within limits defined by the composition of the inventive phosphor. Selection of particular components of the unfired precursor which do not alter the composition of the inventive phosphor is largely a matter of convenience. For example, the inventive phosphor can be prepared using the following components or their hydrates:

- at least one alkaline earth metal fluoride selected from: $BaF_2$, $CaF_2$, and $SrF_2$;
- at least one alkaline earth metal iodide selected from $BaI_2$, $CaI_2$, and $SrI_2$;
- at least one alkaline earth metal halide selected from $BaCl_2$, $BaBr_2$, $CaCl_2$, $CaBr_2$, $SrCl_2$, and $SrBr_2$;
- at least one trivalent europium-(halide, oxide, nitrate, or sulfate);
- at least one transition metal compound selected from compounds of manganese, vanadium, chromium, iron, cobalt, and nickel with halide, oxide, nitrate or sulfate;
- at least one oxosulfur reducing agent selected from thiosulfates of barium, cesium, strontium, and ammonium. The claimed invention is not limited by the scope of this example.

In the preparation of the inventive phosphor, the components are mixed together in a stoichiometric ratio defined by the above-indicated equation:

$$MFX_{1-z}I_z \cdot uM^aX^a : yA : tD : eQ$$

along with oxosulfur reducing agent for iodine. The mixing may be provided by any convenient means, for example, grinding in a mortar, however it is preferred that the components be mixed as a solution or suspension in water. The precursor components can be dissolved in a common solvent, followed by stirring until a digestion/precipitation reaction occurs forming a precursor to the phosphor. The precursor, depending upon the conditions of the reaction, may be a mixture of the starting components, but can be, for example, a host lattice with Eu in the +3 oxidation state. In this example firing drives Eu to the +2 oxidation state. The advantage of the solution/suspension method is that the components of the phosphor are distributed in a very intimate mixture.

A suitable preparation procedure utilizing a solution/suspension, is described in U.S. Pat. No. 4,505,989 to Umemoto et al:

"The mixing procedure is generally carried out in the form of a suspension using distilled water. The distilled water contained in the suspension is then removed to obtain a dry cake. The removal of the distilled water is preferably carried out at room temperature or not so high temperature (for example, not higher than 200° C.) under reduced pressure, or under vacuum, otherwise a combination of under reduced pressure and subsequent under vacuum. The obtained dry mixture is pulverized finely by means of a mortar or the like.

Then, the mixture of the starting materials for the phosphor is placed in a heat-resistant container such as a quartz boat, an alumina crucible or a quartz crucible, and fired in an electric furnace. The temperature for the firing suitably ranges from 600° C. to 1000° C. The firing period is determined depending upon the amount of the mixture of the starting materials charged into the heat resistant container, the firing temperature, etc., and generally ranges from 0.5 to 12 hours. As the firing atmosphere, there can be employed a weak reducing atmosphere such as a nitrogen gas atmosphere containing a small amount of hydrogen gas or a carbon dioxide gas atmosphere containing carbon monoxide gas.

The product obtained by firing conducted under the above-mentioned condition is taken out of the furnace, allowed to stand for cooling, and pulverized. The pulverized product may be again placed in the heat-resistant container and fired in the electric furnace. In the second firing, the temperature of the firing suitably ranges from 500° to 800° C. and the firing period suitably ranges from 0.5 to 12 hours. For carrying out the second firing, there can be employed an inert atmosphere such as a nitrogen gas atmosphere or an argon gas atmosphere, as well as the abovementioned weak reducing atmosphere.

After firing is complete, the fired product is finely pulverized to obtain a powdery phosphor of the invention. The powdery phosphor thus obtained may be processed in a conventional manner involving a variety of procedures for the preparation of phosphors such as a washing procedure, a drying procedured and a sieving procedure." (column 5, line 23-column 6, line 9)

In preparing the phosphor, after the mixing is accomplished, the distilled water contained in the suspension may be removed by a number of methods including thermal drying, rotary drying, spray drying, or drying in a microwave oven. In the latter technique, the suspension is placed in a conventional microwave oven and "cooked" in the same manner as a food item, that is, the microwave oven is adjusted to remove water at a reasonable rate, while maintaining a relatively even temperature in the phosphor intermediate. The phosphor intermediate may be rotated periodically or continuously, as necessary, to help reduce temperature variations. The process is continued until the phosphor intermediate has the form of a dry, white cake. The different drying procedures, and variations in those procedures, can result in differences in the phosphor produced. Drying procedures may be optimized using the results achieved by microwave drying as a benchmark for a preferred phosphor.

In preparing the inventive phosphors, the precursor materials may be fired at a temperature between about 700° C. and about 1300° C.; or may be processed with a flux at lower firing temperatures. Alkali metal salts capable of decomposing to the corresponding alkali metal oxide at temperatures up to about 1000° C. are particularly useful as fluxing agents. The other metals can also, if desired, be initially provided in the form of salts capable of being thermally decomposed to the corresponding oxides. Nitrate, chloride, carbonate and carboxylate salts are all specifically contemplated as starting materials. If organic oxosulfur reducing agents are used, a carbon dioxide atmosphere is desirable during firing to provide for the volatilization of residual carbon.

In the preparation of the phosphors of the invention, after firing, the particles are ground to a particle size suitable for forming the radiographic panels of the invention. The median particle size utilized is generally between about 0.5 and about 40 micrometers. A median particle size of between 1 and about 20 micrometers is preferred for ease of formulation, as well as optimizing panel properties, such as speed, sharpness and noise.

The radiographic panels of the invention containing the inventive phosphor are formed by conventional coating techniques where the phosphor powders are mixed with a solution of a resin binder material and coated by means such as blade coating onto a substrate. U.S. Pat. No. 4,505,989 to Umemoto et al, the disclosure of which is hereby incorporated herein by reference, describes suitable techniques known in the art for preparing an X-ray image storage panel.

The phosphors of the present invention can be blended with other phosphors, if desired, to form an panel having optimal properties for a particular application. Panel constructions containing more than one phosphor-containing layer are also possible, with the present phosphors being present in one or more of the phosphor-containing layers.

The phosphor containing layer of the panel may be overcoated with a protective layer. It is understood that both the protective layer, and the resin forming the matrix into which the phosphor particles are held are preferably formed of transparent resins that do not interfere with the passage of x-rays or stimulating radiation or the emitted light from the phosphors.

While it is in theory possible to prepare a luminescent layer that does not contain any ingredient other than the phosphor itself, in practice the luminescent layer of a panel contains in addition to phosphor particles a polymeric binder to give structural coherence to the luminescent layer. In general the binders useful in the practice of the invention are those conventionally employed in the art. Binders are generally chosen from a wide variety of known organic polymers which are transparent to x-rays, stimulating, and emitted light. Binders commonly employed in the art include sodium o-sulfobenzaldehyde acetal of poly(vinyl alcohol); chlorosulfonated poly(ethylene); a mixture of macromolecular bisphenol poly(carbonates) and copolymers comprising bisphenol carbonates and poly(alkylene oxides); aqueous ethanol soluble nylons; poly(alkyl acrylates and methacrylates) and copolymers of poly(alkyl acrylates and methacrylates with acrylic and methacrylic acid); poly(vinyl butyral); linear polyesters; and poly(urethane) elastomers. These and other useful binders are disclosed in U.S. Pat. Nos. 2,502,529; 2,887,379; 3,617,285; 3,300,310; 3,300,311; and 3,743,833; and in *Research Disclosure*, Vol. 154, February 1977, Item 15444, and Vol. 182, June 1979. *Research Disclosure* is published by Kenneth Mason Publications, Ltd., Emsworth, Hampshire P010 7DD, England. Particularly preferred binders are poly(urethanes), such as those commercially available under the trademark Estane from Goodrich Chemical Co., the trademark Permuthane from the Permuthane Division of ICI, and the trademark Cargill from Cargill, Inc.

Any conventional ratio of phosphor to binder can be employed. Generally thinner phosphor layers and sharper images are realized when a high weight ratio of phosphor to binder is employed. Preferred phosphor to binder ratios are in the range of from about 7:1 to 25:1 for panel constructions intended to withstand commercial exposure repetitions without loss of structural integrity. For limited or single exposure applications it is, of course, appreciated that any minimal amount of binder consistent with structural integrity is satisfactory.

For the highest attainable speeds a white support, such as a titania or barium sulfate loaded or coated support is employed. Particular reflective supports which offer a balance of speed and sharpness are those containing reflective microlenslets, such as are disclosed in U.S. Pat. No. 4,912,333 to Roberts, et al. In those instances in which it is desired to reduce the effective thickness of a phosphor layer below its actual thickness the phosphor layer is modified to impart a small, but significant degree of light absorption. If the binder is chosen to exhibit the desired degree of light absorption, then no other ingredient of the phosphor layer is required to perform the light attenuation function. It is specifically noted that the less structurally complex chromophores for ultraviolet absorption particularly lend themselves to incorporation in polymers. A separate absorber can be incorporated in the phosphor layer to reduce its effective thickness. The absorber can be a dye or pigment capable of absorbing light within a desired spectrum. Black dyes and pigments such as carbon black are, of course, generally useful with phosphors, because of their broad absorption spectra. It is preferable, however, to include a dye or pigment which absorbs some of the stimulating radiation, generally provided by a laser; but mostly reflects emitted light. U.S. Pat. No. 4,491,736 to Teraoka teaches the use of such materials in storage panel.

Apart from the phosphor layers and the assembly features described above, the panel can be of any conventional construction. Panels typically have one or more flexible or rigid support layers. Flexible layers are most commonly polymeric. The most common polymeric supports are films of high dimensional integrity, such as poly(ethylene terephthalate) film supports. In a preferred embodiment of the invention, support is provided by one or more polymeric layers and by a rigid plate of aluminum or the like.

Metal layers, such as aluminum, may enhance reflection. Paper supports, though less common than film supports, are known and can be used for specific applications. Dyes and pigments are commonly loaded into supports to enhance absorption or reflection of light. Air can be trapped in supports to reflect ultraviolet and visible light. Supports and the subbing layers used to improve coating adhesion can be chosen from among those employed for silver halide photographic and radiographic elements, as illustrated by *Research Disclosure*, Vol. 176, December 1978, Item 17643, Section XVII, and *Research Disclosure*, Vol. 184, August 1979, Item 18431, Section I.

An overcoat, though not required, is commonly located over the phosphor layer for humidity and wear protection. The overcoat can be chosen using the criteria described above for the binder. The overcoat can be chosen from among the same polymers used to form either the screen binder or the support, with the requirements of toughness and scratch resistance usually favoring polymers conventionally employed for film supports. For example, cellulose acetate is an overcoat commonly used with the poly(urethane) binders. Overcoat polymers are often used also to seal the edges of the phosphor layer. In a preferred embodiment of the invention, the overcoat is produced in accordance with a U.S. patent application filed concurrently with this application, by Luther C. Roberts, entitled: OVERCOATED RADIATION IMAGE STORAGE PANEL AND METHOD FOR PREPARING RADIATION IMAGE STORAGE PANEL, the disclosure of which is hereby incorporated herein by reference.

While anticurl layers are not required for the panels, they are generally preferred for inclusion. The function of the anticurl layer is to balance the forces exerted by the layers coated on the opposite major surface of a support which, if left unchecked, cause the support to assume a non-planar configuration— e.g., to curl or roll up on itself. Materials forming the anticurl layers can be chosen from among those identified above for use as binders and overcoats. Generally an anticurl layer is formed of the same polymer as the overcoat on the opposite side of the support. For example, cellulose acetate is preferred for both overcoat and anticurl layers.

For best image definition, when the front panel support and subbing and anticurl layers are transparent, the phosphor layer either contains an absorber or overlies such a layer.

Any one or combination of conventional panel features compatible with the features described herein can, of course, be employed. Conventional storage panel constructions are disclosed in U.S. Pat. No. 4,380,702 to Takahashi et al, the disclosure of which is hereby incorporated by reference. Conventional intensifying panel constructions are disclosed in *Research Disclosure,* Vol. 184, August 1979, Item 18431, hereby incorporated herein by reference.

It is preferred that the phosphor panel be produced in accordance with a U.S. patent application filed concurrently with this application, by Joseph F. Bringley, Philip S. Bryan, and Andrea M. Hyde, entitled: PIGMENT STABILIZED RADIATION IMAGE STORAGE PANEL AND METHOD FOR PREPARING RADIATION IMAGE STORAGE PANEL, the disclosure of which is hereby incorporated herein by reference; or a U.S. patent application filed concurrently with this application, by Joseph F. Bringley, Barbara Fisher, Andrea M. Hyde, Philip S. Bryan, and Luther C. Roberts, entitled: RADIOGRAPHIC PHOSPHOR PANEL HAVING BINDER COMPATIBLE OXOSULFUR STABILIZER AND METHOD FOR PREPARING PHOSPHOR PANEL, the disclosure of which is also hereby incorporated herein by reference. The phosphor panels disclosed therein have oxosulfur reducing agent dispersed in a layer of the panel to stabilize against yellowing. The phosphor panels have increased photostimulated luminescence in comparison to unstabilized controls. It has been determined by applicants that the increased photostimulated luminescent provided thereby is cumulative with the increased photostimulated luminescent provided in the claimed invention.

The following Examples and Comparative Examples are presented to further illustrate and elucidate some preferred modes of practice of the invention.

Unless otherwise indicated, all starting materials were commercially obtained. The thiosulfate salts were obtained commercially except as follows. $BaS_2O_3 \cdot H_2O$ was prepared according to the following equation:

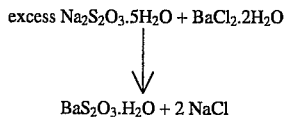

excess $Na_2S_2O_3 \cdot 5H_2O + BaCl_2 \cdot 2H_2O$ $\downarrow$ $BaS_2O_3 \cdot H_2O + 2 NaCl$ In a typical procedure, barium chloride dihydrate was dissolved in about 2 parts by weight of distilled water and a 2-fold excess of sodium thiosulfate was dissolved separately in about 1.5 parts by weight distilled water. The solutions were filtered to remove insoluble impurities and were then heated to about 40°–50° C. The barium chloride solution was then added via an addition funnel to the thiosulfate solution over about 5 minutes with vigorous stirring, and a white precipitate immediately formed. The precipitate was then collected by vacuum filtration or other means and washed with copious amounts of distilled water to remove any residual sodium chloride by-product. The white solid was then air dried for 24 hours to yield very pure $BaS_2O_3 \cdot H_2O$. The product was then analyzed by powder X-ray diffraction to confirm its identity and purity. The polythionate salts reported were obtained from commercial sources.

Hydrous salts were first dried when necessary in air or under vacuum at a suitable temperature to remove waters of crystallization. $BaS_2O_3 \cdot H_2O$ was dried at 150° C. for 24 hours yielding $BaS_2O_3$. $MgS_2O_3 \cdot 6H_2O$ was dried at 110° C. yielding $MgS_2O_3 \cdot 3H_2O$. $K_2S_2O_3 \cdot 1.5H_2O$ was dried in vacuo at 115° C. for 18 hours yielding $K_2S_2O_3 \cdot Na_2S_2O_3$ and $(NH_4)_2S_2O_3$ were obtained as anhydrous salts. The anhydrous salts were then pulverized in each case to obtain a particle size ranging from 0.1 to 20 micrometers. The preferred particle size ranges from 0.1 to 3 micrometers.

In order to reduce experimental variability, Examples and their Comparative Examples (as indicated by the groupings in the tables below) were run at the same time.

The relative photostimulated luminescence intensities (PSL) of the phosphor powders were measured by packing the powders into aluminum planchets (2 mm high by 24 mm diameter) at a coverage of about 1 $g/cm^2$ and exposing the sample to filtered X-radiation. The X-ray source was a tungsten target tube operating at 70 kVp and 3.0 mA. The filtration consisted of a 3.5 cm thickness of aluminum. After exposure to X-rays, the samples were stimulated with a 4-millisecond pulse at 633 nanometers from a 12 mW helium-neon laser. The stimulated emission was detected using a photomultiplier tube after passing through a Schott BG-25 filter. The PSL responses for Examples having thiosulfate salt containing precursor compositions are reported relative to Comparative Examples which did not contain any of the thiosulfate salt, but were otherwise the same. The response of each Comparative Example was arbitrarily set at 100 units.

Examples 1–7:

Examples 1–7 were carried out using the following general procedure. All of these Examples contained an iodide concentration of z=0.2 and a Europium concentration of y=0.001 moles.

In a 100 ml beaker containing a Teflon coated magnetic stir bar, 15.22 g of $BaBr_2 \cdot 2H_2O$, 4.87 g $BaI_2 \cdot 2H_2O$ and 0.040 g of $EuBr_2$ were dissolved in 32 ml $H_2O$. To this solution was then added the appropriate number of moles of barium thiosulfate hydrate corresponding in each example to the amounts specified in Table 1. To this mixture, 10.0 g $BaF_2$ (containing 28,000 molar parts per million Sr) was added slowly with stirring over 60 seconds. The mixture was allowed to stir at 25° C. for 30 minutes and then was carefully heated to dryness in a microwave oven over 15–20 minutes. The resulting white cakes were then ground separately with an agate mortar and pestle and placed in 50 ml alumina crucibles. The white powders contained in the crucibles were then fired along with the powders of Comparative Examples 1–2 in a tube furnace containing an atmosphere of dry argon at 850° C. for 3 hours. The crucibles were allowed to cool to near room temperature and the samples removed from the furnace. The photostimulated luminescence response was then measured as above-described. Results are given in Table 1.

Comparative Examples 1–2:

Comparative Examples 1 and 2 were prepared and evaluated in an identical manner to Examples 1–7 except as to the amount of thiosulfate used, as specified in Table 1. The photostimulated luminescence response of the examples was then measured as described in the preceding section. The results of are given in Table 1.

Examples 8–13:

Examples 8–13 were carried out in an identical manner as those of Examples 1–7 except that the appropriate amounts of thiosulfate salts other than barium thiosulfate were added. The result of these experiments are given in Table 2 for sodium thiosulfate (Example 8), in Table 3 for ammonium thiosulfate (Examples 9–10) and in Table 4 for potassium thiosulfate (Example 11) and magnesium thiosulfate (Examples 12–13).

Comparative Examples 3–5:

Comparative Examples 3–5 were carried out in an identical manner as Comparative Example 2. The results are in Tables 2–4 with contemporaneous examples.

Examples 14–17:

Examples 14–17 were carried out in an identical manner as those of Examples 1–7 except that the iodide and bromide ratios were adjusted as indicated in Tables 5–6.

Comparative Examples 6–7:

Comparative Examples 6–7 were carried out in an identical manner as Comparative Example 2 except that the iodide and bromide ratios were adjusted as indicated in Tables 5–6. The results are in Tables 5–6 with contemporaneous examples.

Examples 18–21:

Examples 18–21 were carried out in an identical manner as those of Examples 1–7 except that the amounts of the polythionate salts indicated in Table 7, were added in place of thiosulfate salts.

Comparative Example 8:

Comparative Example 8 was carried out in an identical manner as Comparative Example 2. The results are in Table 7 with contemporaneous examples.

Example 22:

Stabilized intermediate was prepared having an iodide concentration of z=0.2 and a Europium concentration of y=0.001 moles. In a 100 ml beaker containing a Teflon coated magnetic stir bar, 15.22 grams of $BaBr_2.2H_2O$ 4.87 grams of $BaI_2.2H_2O$ were dissolved together in 17 ml of $H_2O$. The solution was then filtered through a glass frit and 15.2 ml of additional $H_2O$ was added followed by 0.14 ml of 0.8M $EuBr_3$ in 6N HBr (aq.). Then, 0.0152 grams ( 0.0005 mol/mol $BaFBr_{0.80}I_{0.20}$:Eu) of $BaS_2O_3.H_2O$ was added. To this mixture, was added 10.0 g $BaF_2$ (containing 28,000 molar parts per million Sr) slowly with stirring over 60 seconds. The suspension was allowed to stir at 25° C. for 30 minutes and then carefully Examples 26–27:

In Example 26, phosphor was prepared and evaluated as in Example 22. In Example 27, phosphor was prepared and evaluated in the same manner, except that the $BaF_2$ used had a Sr molar concentration of 10.0 parts per million. Results are reported in Table 10. heated to dryness in a microwave oven over 15–20 minutes. The resulting white cake was then ground with an agate mortar and pestle and placed in a 50 ml alumina crucible. The white powder contained in the crucible was then fired along with the white powder of Examples 23–24 and Comparative Example 9 in a tube furnace containing an atmosphere of dry argon at 850° C. for 3 hours. The crucibles were allowed to cool to near room temperature and the samples removed from the furnace. The photostimulated luminescence response was then measured as above-described. Results are given in Table 8. In Example 3 above, phosphor was prepared, and evaluated as in Example 22, with the exception that 0.0310 grams (0.001 mol/mol $BaFBr_{0.80}I_{0.20}$:Eu) of $BaS_2O_3.H_2O$ was added. Example 3 is also reported in Table 8.

Example 23:

Phosphor was prepared, evaluated and reported as in Example 22, except that 0.0152 g (0.0005 mol/mol $BaFBr_{0.80}I_{0.20}$:Eu) of $BaS_2O_3.H_2O$ was added immediately after the suspension was allowed to stir 30 minutes, but before the suspension was dried.

Comparative Example 9:

Phosphor was prepared, evaluated and reported as in Example 22, except that $BaS_2O_3.H_2O$ was not added.

Examples 24–25:

Phosphor was prepared, evaluated and reported as in Example 22, except that $(NH_4)_2S_2O_3$ was substituted for $BaS_2O_3.H_2O$ in Example 26 and the dried white cakes were allowed to sit in air for 5 days before firing. This last step was performed to allow the dried powders to be exposed to air and water.

Comparative Example 10:

Phosphor was prepared, evaluated and reported as in Example 24, except that $BaS_2O_3.H_2O$ was not added.

TABLE 1

The effect of addition of $BaS_2O_3.H_2O$ upon the photostimulated luminescence of $BaFBr_{0.8}I_{0.2}$:.001Eu.

| Example or Comparative Example | mol $BaS_2O_3.H_2O$ per mol BFB/I | PSL Response |
| --- | --- | --- |
| Example 1 | 0.00025 | 161 |
| Example 2 | 0.0005 | 171 |
| Example 3 | 0.001 | 261 |
| Example 4 | 0.002 | 161 |
| Example 5 | 0.0025 | 132 |
| Example 6 | 0.01 | 86 |
| Example 7 | 0.10 | 12 |
| Comparative Example 1 | 0.25 | 0 |
| Comparative Example 2 | 0.00 | 100 |

TABLE 2

The effect of addition of $Na_2S_2O_3\text{-}5H_2O$ upon the photostimulated luminescence of $BaFBr_{0.8}I_{0.2}$:Eu.

| Example or Comparative Example | mol $Na_2S_2O_3\text{-}5H_2O$ per mol BFB/I | PSL Response |
| --- | --- | --- |
| Example 8 | 0.0005 | 151 |
| Comparative Example 3 | 0.00 | 100 |

TABLE 3

The effect of addition of $(NH_4)_2S_2O_3$ upon the photostimulated luminescence of $BaFBr_{0.8}I_{0.2}$:Eu.

| Example or Comparative Example | Mol $(NH_4)_2S_2O_3$ per mol BFB/I | PSL Response |
| --- | --- | --- |
| Example 9 | 0.0005 | 174 |
| Example 10 | 0.001 | 147 |
| Comparative Example 4 | 0.00 | 100 |

TABLE 4

The effect of addition of $K_2S_2O_3$ and $MgS_2O_3 \cdot 6H_2O$ upon the photostimulated luminescence of $BaFBr_{0.8}I_{0.2}:Eu$.

| Example or Comp. Example | thiosulfate | mol thiosulfate per mol BFB/I | PSL Response |
|---|---|---|---|
| Ex. 11 | $K_2S_2O_3$ | 0.0005 | 169 |
| Ex. 12 | $MgS_2O_3 \cdot 6H_2O$ | 0.0005 | 136 |
| Ex. 13 | $MgS_2O_3 \cdot 6H_2O$ | 0.001 | 200 |
| C. Ex. 5 | none | 0.00 | 100 |

TABLE 5

The effect of addition of $BaS_2O_3 \cdot H_2O$ upon the photostimulated luminescence of $BaFBr_{0.5}I_{0.5}:0.001$ Eu.

| Example or Comparative Example | Mol $BaS_2O_3 \cdot H_2O$ per mol BFB/I | PSL Response |
|---|---|---|
| Example 14 | 0.0005 | 109 |
| Example 15 | 0.001 | 114 |
| Example 16 | 0.002 | 125 |
| Comparative Example 6 | 0.00 | 100 |

TABLE 6

The effect of addition of $BaS_2O_3 \cdot H_2O$ upon the photostimulated luminescence of $BaFBr_{0.95}I_{0.05}:0.001$ Eu.

| Example or Comparative Example | Mol $BaS_2O_3 \cdot H_2O$ per mol BFB/I | PSL Response |
|---|---|---|
| Example 17 | 0.0005 | 112 |
| Comparative Example 7 | 0.00 | 100 |

TABLE 7

The effect of addition of various oxosulfur reducing agents upon the photostimulated luminescence of $BaFBr_{0.8}I_{0.2}:Eu$.

| Example or Comparative Example | Oxosulfur reducing agent | mol Oxosulfur reducing agent per mol BFB/I | PSL Response |
|---|---|---|---|
| Example 18 | $Na_2SO_3$ | 0.0005 | 132 |
| Example 19 | $Na_2S_2O_4$ | 0.0005 | 120 |
| Example 20 | $Na_2S_2O_5$ | 0.0005 | 117 |
| Example 21 | $Na_2S_4O_6$ | 0.0005 | 134 |
| Comparative Example 8 | none | 0.00 | 100 |

TABLE 8

The effect of addition of $BaS_2O_3 \cdot H_2O$ at various points in the phosphor preparation process, upon the photostimulated luminescence of $BaFBr_{0.8}I_{0.2}:0.001Eu$.

| Example or Comparative Example | Point of Addition | mol $BaS_2O_3 \cdot H_2O$ per mol BFB/I | PSL Response |
|---|---|---|---|
| Example 22 | Dissolution | 0.0005 | 166 |
| Example 3 | Dissolution | 0.0010 | 261 |
| Example 23 | Before drying | 0.0005 | 137 |
| Comparative Example 9 | No addition | none | 100 |

TABLE 9

Photostimulated luminescence of $BaFBr_{0.8}I_{0.2}:0.001Eu$ whose stabilized and unstabilized intermediates were exposed to ambient environmental conditions for five days prior to firing.

| Example or Comparative Example | Addenda | mol addenda per mol BFB/I | PSL Response |
|---|---|---|---|
| Example 24 | $BaS_2O_3 \cdot H_2O$ | 0.001 | 319 |
| Example 25 | $(NH_4)_2S_2O_3$ | 0.001 | 174 |
| Comparative Example 10 | none | — | 100 |

TABLE 10

Photostimulated luminescence of $Ba_{(1-a)}Sr_{(a)}FBr_{0.8}I_{0.2}:0.001Eu:0.001BaS_2O_3 \cdot H_2O$

| Example or Comparative Example | Value of (a) | PSL Response |
|---|---|---|
| Example 26 | 0.014 | 100 |
| Example 27 | 0.000005 | 104 |

The preceding tables evidence the advantages the invention.

The results provided by the claimed invention cannot be fully explained. Prior to Applicant's invention, it would have seemed reasonable to hypothesize that free iodine present in the intermediate prior to firing would be driven off during firing and that the only net effect of the free iodine in the intermediate would be a slight decrease in the ultimate stoichiometric ratio of iodine atoms in the phosphor produced. The oxosulfur reducing agent would have hypothetically reversed the slight decrease in iodine stoichiometry. Under this hypothesis, a prediction could have been made that stabilization would increase with increasing concentrations of oxosulfur reducing agent relative to total phosphor produced, up to a moderate concentration at which time a plateau in relative photostimulated luminescence intensities would be reached.

Surprisingly, the examples contradict this hypothesis. Referring to Tables 5 and 6, the same percentage increase in PSL response is seen with the use of 0.0005 mol thiosulfate/mol phosphor in a phosphor with a 0.5:1 ratio of I to Ba as in a phosphor with a 0.05:1 ratio of I to Ba. Referring now to Table 1, the examples further indicate that only at very low concentrations does oxosulfur reducing agent increase relative photostimulated luminescence intensities in the phosphor produced. At slightly higher, but still relatively low concentrations, the relative photostimulated luminescence intensities are decreased or even eliminated. Examples 1–7 and Comparative Examples 1–2 demonstrate the inventive phosphor differs from and is superior to a comparable phosphor which lacked oxosulfur reducing agent in the precursor composition. From Table 1 it is clear that the addition of 0.00025–0.0025 mole of $BaS_2O_3 \cdot H_2O$ to the precursor composition during preparation of the phosphor significantly improved the PSL response of the resulting phosphor powder. A peak in the PSL response occurs near 0.001 mol $BaS_2O_3 \cdot H_2O$ per mol $BaFBr_{0.8}I_{0.2}:0.001Eu^{2+}$. The PSL response rapidly decreases for concentrations of thiosulfate greater than about 0.01.

These results contrast what the teachings of U.S. Pat. No. 4,138,529 (Mori et al) in which BaSO$_4$ (which is not a reducing agent for iodine) is incorporated in an alkaline earth metal-potassium fluoro(chloro or bromo) phosphor, which does not contain iodine, at a concentration between 0.01 and 0.50, or preferably between 0.025 and 0.20, relative to the molar concentration of fluorine atoms in the composition formula. At similar concentrations, as shown in Table 1 for Example 7 and Comparative Example 1, thiosulfate dramatically reduces the response of the phosphor.

Examples 22, 3, and 23 demonstrate the ability of thiosulfate salts to stabilize phosphor intermediates: aqueous suspensions of BaFBr$_{1-z}$I$_z$:yEu3+. Also demonstrated is the advantage realized when thiosulfate salts are added in the aqueous digestion/precipitation step of a storage phosphor preparation. For example, from Table 1 and Table 8 it is observed that the maximum PSL response of the storage phosphor is achieved when the thiosulfate is added at the earliest possible point in the preparation. Examples 24–25 demonstrate that the relatively long term stability of the stabilized intermediate. Examples 26–27 demonstrate that replacement of a substantial portion of Ba with Sr had little if any effect on PSL response.

Based upon the Examples herein, it could be hypothesized that the oxosulfur reducing agent has two mechanisms of action in the claimed invention, a direct reaction of oxosulfur reducing agent with free iodine in the stabilized intermediate and a modification of the crystal structure of the phosphor by incorporation of the oxosulfur reducing agent, in some form, or otherwise. The scope of the claimed invention is, however, not limited by any explanation, theory or hypothesis.

Referring now to Tables 2–4, and Table 7, Examples 8–13 and 18–21 demonstrate that improved PSL response is not limited to a particular cation and demonstrate the use of various oxosulfur reducing agents. In these examples, improved PSL response is observed for all of the various oxosulfur reducing agents. The examples of barium and ammonium thiosulfate clearly separate the effect of the counterion from the thiosulfate anion. It is, for example, highly unlikely that ammonium could substitute into the BaFBr/I lattice, so as to play a role in the PSL. Barium thiosulfate demonstrates this yet more clearly since a cation substituted by itself could play no role in the PSL response.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A storage phosphor consisting essentially of the product of firing, at a temperature from about 700° to 1300° C., a combination of species characterized by the relationship:

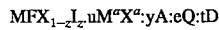

wherein

M is selected from the group consisting of Mg, Ca, Sr, and Ba and combinations thereof;

X is selected from the group consisting of Cl and Br and combinations thereof;

Ma is selected from the group consisting of Na, K, Rb, and Cs and combinations thereof;

Xa is selected from the group consisting of F, Cl, Br, and I and combinations thereof;

A is selected from the group consisting of Eu, Ce, Sm, and Tb and combinations thereof;

Q is selected from the group consisting of BeO, MgO, CaO, SrO, BaO, ZnO, Al$_2$O$_3$, La$_2$O$_3$, In$_2$O$_3$, SiO$_2$, TiO$_2$, ZrO$_2$, GeO$_2$, SnO$_2$, Nb$_2$O$_5$, Ta$_2$O$_5$, and ThO$_2$ and combinations thereof;

D is selected from the group consisting of V, Cr, Mn, Fe, Co, and Ni and combinations thereof;

z is from $1\times10^{-4}$ to 1;

u is from 0 to 1;

y is from $1\times10^{-4}$ to 0.1;

e is from 0 to 1; and t is from 0 to $1\times10^{-2}$; and oxosulfur reducing agent for iodine, wherein said oxosulfur reducing agent for iodine is present with said combination of species in an amount sufficient to increase relative photostimulated luminescence intensities relative to the phosphor defined above absent said reducing agent for iodine.

2. The storage phosphor of claim 1 wherein said oxosulfur reducing agent is selected from the group consisting of oxosulfur species having the general formula S$_j$O$_k$ wherein 0.25<j/k<1.0.

3. The storage phosphor of claim 1 wherein said reducing agent is selected from the group consisting of: inorganic and organic salts of SO$_3^{2-}$, S$_2$O$_4^{2-}$, S$_2$O$_3^{2-}$, S$_2$O$_5^{2-}$, and S$_4$O$_6{}^{2-}$ and Bunte salts and combinations thereof.

4. The storage phosphor of claim 1 wherein said reducing agent comprises thiosulfate salt.

5. The storage phosphor of claim 1 wherein t=0.

6. The storage phosphor of claim 1 further characterized as the product of firing a composition of matter consisting essentially of oxosulfur reducing agent for iodine, and a combination of species characterized by the relationship:

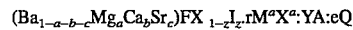

wherein

X is selected from the group consisting of Cl and Br and combinations thereof;

M$^a$ is selected from the group consisting of Na, K, Rb, and Cs and combinations thereof;

X$^a$ is selected from the group consisting of F, Cl, Br, and I and combinations thereof;

A is selected from the group consisting of Eu, Ce, Sm, and Tb and combinations thereof;

Q is selected from the group consisting of BeO, MgO, CaO, SrO, BaO, ZnO, Al$_2$O$_3$, La$_2$O$_3$, In$_2$O$_3$, SiO$_2$, TiO$_2$, ZrO$_2$, GeO$_2$, SnO$_2$, Nb$_2$O$_5$, Ta$_2$O$_5$, and ThO$_2$ and combinations thereof;

a+b+c is from 0 to 0.4;

z is from $1\times10^{-4}$ to 1;

r is from $1\times10^{-6}$ to 0.1;

y is from $1\times10^{-4}$ to 0.1;

e is from $1\times10^{-5}$ to 0.1; and wherein said oxosulfur reducing agent for iodine is present with said combination of species in an amount sufficient to increase relative photostimulated luminescence intensities relative to the phosphor defined above absent said oxosulfur reducing agent.

7. The storage phosphor of claim 6 wherein said reducing agent is selected from the group consisting of the group consisting of oxosulfur species having the general formula S$_j$O$_k$ wherein 0.25< j/k1.0.

8. The storage phosphor of claim 6 wherein said reducing agent is selected from the group consisting of: salts of $SO_3^{2-}$, $S_2O_4^{2-}$, $S_2O_3^{2-}$, $S_2O_5^{2-}$, and $S_4O_6^{2-}$ and Bunte salts and combinations thereof.

9. The storage phosphor of claim 6 wherein said reducing agent comprises thiosulfate salt.

10. The storage phosphor of claim 6 wherein said reducing agent is present in said phosphor in a molar ratio of sulfur to alkaline earth metal of less than 0.020.

11. The storage phosphor of claim 1 wherein said reducing agent is present in said phosphor in a molar ratio of sulfur to alkaline earth metal of less than 0.020.

12. The storage phosphor of claim 1 wherein said reducing agent is present in said composition of matter in a molar ratio of sulfur to alkaline earth metal of from $1\times10^{-4}$ to 0.020.

13. A storage phosphor comprising the product of firing, at a temperature from about 700° to 1300° C., a composition of matter consisting essentially of oxosulfur reducing agent for iodine, and a combination of species characterized by the relationship:

$$(Ba_{1-a-b-c}Mg_aCa_bSr_c)FX_{1-z}I_z.rM^aX^a{:}yA{:}eQ$$

wherein

X is selected from the group consisting of Cl and Br and combinations thereof;

$M^a$ is selected from the group consisting of Na, K, Rb, and Cs and combinations thereof;

$X^a$ is selected from the group consisting of F, Cl, Br, and I and combinations thereof;

A is selected from the group consisting of Eu, Ce, Sm, and Tb and combinations thereof;

Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$ and combinations thereof;

a+b+c is from 0 to 0.4;

z is from $1\times10^{-4}$ to 1;

r is from $1\times10^{-6}$ to 0.1;

y is from $1\times10^{-4}$ to 0.1;

e is from $1\times10^{-5}$ to 0.1; and wherein said oxosulfur reducing agent is selected from the group consisting of Bunte compounds having the general formula $R'SSO_3D$, where R' is a covalently bonded organic substituent and D is a counterion, and organic and inorganic oxosulfur salts having anions of the general formula $S_jO_k$ wherein $0.25 < j/k < 1.0$;

and wherein said oxosulfur reducing agent is present prior to said firing in a molar ratio of sulfur to alkaline earth metal of greater than $1\times10^{-4}$ and less than 0.020.

14. The phosphor of claim 13 wherein A is Eu.

15. The phosphor of claim 13 wherein said reducing agent is selected from the group consisting of: salts of $SO_3^{2-}$, $S_2O_4^{2-}$, $S_2O_3^{2-}$, $S_2O_5^{2-}$, and $S_4O_6^{2-}$.

16. The phosphor of claim 13 wherein said oxosulfur reducing agent comprises thiosulfate.

17. A radiographic image storage panel comprising a support and a fluorescent layer including phosphor crystals capable of absorbing X-radiation and emitting longer wavelength electromagnetic radiation in response to stimulating radiation of a third wavelength, said phosphor crystals consisting essentially of the product of firing, at a temperature from about 700° to 1300° C., a combination of species characterized by the relationship:

$$MFX_{1-z}I_z.uM^aX^a{:}yA{:}eQ{:}tD$$

wherein

M is selected from the group consisting of Mg, Ca, Sr, and Ba and combinations thereof;

X is selected from the group consisting of Cl and Br and combinations thereof;

$M^a$ is selected from the group consisting of Na, K, Rb, and Cs and combinations thereof;

$X^a$ is selected from the group consisting of F, Cl, Br, and I and combinations thereof;

A is selected from the group consisting of Eu, Ce, Sm, and Tb and combinations thereof;

Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$ and combinations thereof;

D is selected from the group consisting of V, Cr, Mn, Fe, Co, and Ni and combinations thereof;

z is from $1\times10^{-4}$ to 1;

u is from 0 to 1;

y is from $1\times1\times10^{-4}$ to 0.1;

e is from 0 to 1; and t is from 0 to $1\times10^{-2}$; and oxosulfur reducing agent for iodine, wherein said oxosulfur reducing agent for iodine is present in said combination of species in an amount sufficient to increase relative photostimulated luminescence intensities relative to the phosphor defined above absent said reducing agent for iodine.

18. The panel of claim 17 further characterized as consisting essentially of the product of firing a composition of matter consisting essentially of oxosulfur reducing agent for iodine, and a combination of species characterized by the relationship:

$$(Ba_{1-a-b-c}Mg_aCa_bSr_c)FX_{1-z}I_z.rM^aX^a{:}yA{:}eQ$$

wherein

X is selected from the group consisting of Cl and Br;

$M^a$ is selected from the group consisting of Na, K, Rb, and Cs;

$X^a$ is selected from the group consisting of F, Cl, Br, and I;

A is selected from the group consisting of Eu, Ce, Sm, and Tb;

Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$;

a+b+c is from 0 to 0.4;

z is from $1\times10^{-4}$ to 1;

r is from $10^{-6}$ to 0.1;

y is from $1\times10^{-4}$ to 0.1;

e is from $10^{-5}$ to 0.1; and wherein said oxosulfur reducing agent for iodine is present prior to said firing in an amount sufficient to increase relative photostimulated luminescence intensities relative to the phosphor defined above absent said oxosulfur reducing agent.

19. The panel of claim 18 wherein said oxosulfur reducing agent is present prior to said firing, in a molar ratio of sulfur to alkaline earth metal of greater than $1\times10^{-4}$ and less than 0.020.

20. The panel of claim 19 wherein said oxosulfur reducing agent is selected from the group consisting of Bunte compounds having the general formula $R'SSO_3D$, where R' is a covalently bonded organic substituent and D is a counterion, and organic and inorganic oxosulfur salts having anions of the general formula $S_jO_k$ wherein $0.25<j/k<1.0$.

21. The panel of claim 19 wherein said reducing agent is selected from the group consisting of: salts of $SO_3^{2-}$, $S_2O_4^{2-}$, $S_2O_3^{2-}$, $S_2O_5^{2-}$, and $S_4O_6^{2-}$.

22. A method for preparing a radiographic storage phosphor comprising dispersing in an aqueous solvent an oxosulfate reducing agent for molecular iodine and a plurality of precursor compounds having the total elemental composition of a phosphor selected from the group consisting of divalent alkaline earth metal fluorohalide phosphors containing iodine which satisfy the relationship:

$$MFX_{1-z}I_z \cdot uM^aX^a : yA : eQ : tD$$

wherein

M is selected from the group consisting of Mg, Ca, Sr, and Ba and combinations thereof;

X is selected from the group consisting of Cl and Br and combinations thereof;

$M^a$ is selected from the group consisting of Na, K, Rb, and Cs and combinations thereof;

$X^a$ is selected from the group consisting of F, Cl, Br, and I and combinations thereof;

A is selected from the group consisting of Eu, Ce, Sm, and Tb and combinations thereof;

Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$ and combinations thereof;

D is selected from the group consisting of V, Cr, Mn, Fe, Co, and Ni and combinations thereof;

z is from $1\times10^{-4}$ to 1;

u is from 0 to 1;

y is from $1\times10^{-4}$ to 0.1;

e is from 0 to 1; and t is from 0 to $1\times10^{-2}$;

wherein said oxosulfur reducing agent for iodine is present with said precursor compounds in a molar ratio of sulfur to alkaline earth metal of greater than $1\times10^{-4}$ and less than 0.020; said plurality of precursor compounds yielding said phosphor as a product of firing;

drying said dispersion; and firing the product of said drying, said firing being at a temperature from about 700° to 1300° C.

23. The method of claim 22 wherein said precursor compounds satisfy the relationship:

$$(Ba_{1-a-b-c}Mg_aCa_bSr_c)FX_{1-z}I_z \cdot rM^aX^a : yA : eQ$$

wherein

X is selected from the group consisting of Cl and Br and combinations thereof;

$M^a$ is selected from the group consisting of Na, K, Rb, and Cs and combinations thereof;

$X^a$ is selected from the group consisting of F, Cl, Br, and I and combinations thereof;

A is selected from the group consisting of Eu, Ce, Sm, and Tb and combinations thereof;

Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$ and combinations thereof;

a+b+c is from 0 to 0.4;

z is from $1\times10^{-4}$ to 1;

r is from $1\times10^{-6}$ to 0.1;

y is from $1\times10^{-4}$ to 0.1;

e is from $1\times10^{-5}$ to 0.1.

24. A method for preparing a stabilized radiographic phosphor intermediate comprising dispersing in an aqueous solvent an oxosulfate reducing agent and a plurality of precursor compounds having the total elemental composition of a phosphor selected from the group consisting of divalent alkaline earth metal fluorohalide phosphors containing iodine which satisfy the relationship:

$$MFX_{1-z}I_z \cdot uM^aX^a : yA : eQ : tD$$

wherein

M is selected from the group consisting of Mg, Ca, Sr, and Ba and combinations thereof;

X is selected from the group consisting of Cl and Br and combinations thereof;

$M^a$ is selected from the group consisting of Na, K, Rb, and Cs and combinations thereof;

$X^a$ is selected from the group consisting of F, Cl, Br, and I and combinations thereof;

A is selected from the group consisting of Eu, Ce, Sm, and Tb and combinations thereof;

Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$ and combinations thereof;

D is selected from the group consisting of V, Cr, Mn, Fe, Co, and Ni and combinations thereof;

z is from $1\times10^{-4}$ to 1;

u is from 0 to 1;

y is from $1\times10^{-4}$ to 0.1;

c is from 0 to 1; and t is from 0 to $1\times10^{-2}$;

wherein said oxosulfur reducing agent for iodine is present with said precursor compounds in a molar ratio of sulfur to alkaline earth metal of greater than $1\times10^{-4}$ and less than 0.020.

25. The method of claim 24 further comprising drying said dispersion using microwave radiation.

26. The method of claim 25 wherein said reducing agent is selected from the group consisting of Bunte compounds having the general formula $R'SSO_3D$, where R' is a covalently bonded organic substituent and D is a counterion, and organic and inorganic oxosulfur salts having anions of the general formula $S_jO_k$ wherein $0.25<j/k<1.0$.

27. A stabilized radiographic phosphor intermediate comprising an oxosulfate reducing agent and a plurality of precursor compounds having the total elemental composition of a phosphor selected from the group consisting of divalent alkaline earth metal fluorohalide phosphors containing iodine which satisfy the relationship:

$$MFX_{1-z}I_z \cdot uM^aX^a : yA : eQ : tD$$

wherein

M is selected from the group consisting of Mg, Ca, Sr, and Ba and combinations thereof;

X is selected from the group consisting of Cl and Br and combinations thereof;

$M^a$ is selected from the group consisting of Na, K, Rb, and Cs and combinations thereof;

$X^a$ is selected from the group consisting of F, Cl, Br, and I and combinations thereof;

A is selected from the group consisting of Eu, Ce, Sm, and Tb and combinations thereof;

Q is selected from the group consisting of BeO, MgO, CaO, SrO, BaO, ZnO, $Al_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$ and combinations thereof;

D is selected from the group consisting of V, Cr, Mn, Fe, Co, and Ni and combinations thereof;

z is from $1 \times 10^{-4}$ to 1;

u is from 0 to 1;

y is from $1 \times 10^{-4}$ to 0.1;

e is from 0 to 1; and t is from 0 to $1 \times 10^{-2}$;

wherein said oxosulfur reducing agent for iodine is present with said precursor compounds in a molar ratio of sulfur to alkaline earth metal of greater than $1 \times 10^{-4}$ and less than 0.020.

28. The stabilized radiographic phosphor intermediate of claim 27 wherein said oxosulfur reducing agent is selected from the group consisting of Bunte compounds having the general formula $R'SSO_3D$, where R' is a covalently bonded organic substituent and D is a counterion, and organic and inorganic oxosulfur salts having anions of the general formula $S_jO_k$ wherein $0.25 < j/k < 1.0$.

29. The phosphor of claim 1 wherein M is $$Ba_{(1-a)}Sr_{(a)}$$

wherein a is from $5 \times 10^{-6}$ to 0.015.

30. The method of claim 22 wherein M is $$Ba_{(1-a)}Sr_{(a)}$$

wherein a is from $5 \times 10^{-6}$ to 0.015.

* * * * *